(12) United States Patent
Li et al.

(10) Patent No.: US 12,172,849 B2
(45) Date of Patent: Dec. 24, 2024

(54) SYSTEM AND METHOD FOR PROCESSING LOGISTIC OBJECT, AND SORTING APPARATUS

(71) Applicant: CAINIAO SMART LOGISTICS HOLDING LIMITED, Grand Cayman (KY)

(72) Inventors: Jianjun Li, Hangzhou (CN); Lijun Zhu, Hangzhou (CN); Honglei Qi, Hangzhou (CN); Fei Wu, Hangzhou (CN)

(73) Assignee: CAINIAO SMART LOGISTICS HOLDING LIMITED, Grand Cayman (KY)

( * ) Notice: Subject to any disclaimer, the term of this patent is extended or adjusted under 35 U.S.C. 154(b) by 917 days.

(21) Appl. No.: 17/237,760

(22) Filed: Apr. 22, 2021

(65) Prior Publication Data

US 2021/0237987 A1 Aug. 5, 2021

Related U.S. Application Data

(63) Continuation of application No. PCT/CN2019/111618, filed on Oct. 17, 2019.

(30) Foreign Application Priority Data

Oct. 23, 2018 (CN) .......................... 201811236790.8

(51) Int. Cl.
*B65G 47/49* (2006.01)
*B07C 3/08* (2006.01)
*B65G 47/44* (2006.01)

(52) U.S. Cl.
CPC .............. *B65G 47/493* (2013.01); *B07C 3/08* (2013.01); *B65G 47/44* (2013.01);
(Continued)

(58) Field of Classification Search
CPC .......... B07C 3/08; B65G 37/02; B65G 47/44; B65G 47/46; B65G 47/493;
(Continued)

(56) References Cited

U.S. PATENT DOCUMENTS

| 5,988,054 | A | 11/1999 | Wieglus |
| 6,292,710 | B1 | 9/2001 | Bonnet |

(Continued)

FOREIGN PATENT DOCUMENTS

| CN | 204980269 U | 1/2016 |
| CN | 105457897 A | 4/2016 |

(Continued)

OTHER PUBLICATIONS

PCT International Search Report and the Written Opinion mailed Jan. 21, 2020, issued in related International Application No. PCT/CN2019/111618, with partial English translation (12 pages).

(Continued)

*Primary Examiner* — Gene O Crawford
*Assistant Examiner* — Keith R Campbell

(57) ABSTRACT

A system for processing a logistic object, comprising: a sorting apparatus, a transportation apparatus, and an output apparatus. The sorting apparatus comprises: a logistic object conveyor, at least one chute, and at least one sorting platform. The logistic object conveyor is connected to one end of the at least one sliding chute, and the other end of each chute is connected to one sorting platform. The transportation apparatus comprises a supporting assembly. The output apparatus comprises an output apparatus body and a control device. Also provided are a sorting apparatus and a method for processing a logistic object. The system for processing a logistic object can automatically implement the sorting of (Continued)

logistic objects to complete the packaging processing of the logistic objects, thereby improving the logistic processing efficiency.

19 Claims, 6 Drawing Sheets

(52) U.S. Cl.
CPC ............... *B65G 2201/025* (2013.01); *B65G 2203/0216* (2013.01); *B65G 2203/0233* (2013.01); *B65G 2203/041* (2013.01)

(58) Field of Classification Search
CPC ...... B65G 2201/025; B65G 2203/0216; B65G 2203/0233; B65G 2203/041
See application file for complete search history.

(56) References Cited

U.S. PATENT DOCUMENTS

| | | | |
|---|---|---|---|
| 9,145,272 B2 | 9/2015 | Lykkegaard | |
| 9,367,981 B2 | 6/2016 | Szesko et al. | |
| 9,415,949 B2 | 8/2016 | Buse | |
| 9,828,192 B2 | 11/2017 | Baechle et al. | |
| 9,988,218 B2* | 6/2018 | Dugat | B65G 13/10 |
| 10,102,494 B2 | 10/2018 | Skaaksrud | |
| 10,187,748 B2 | 1/2019 | Skaaksrud | |
| 10,301,122 B2 | 5/2019 | Moroni et al. | |
| 10,640,303 B2* | 5/2020 | Kuhn | B65G 17/24 |
| 10,643,294 B2 | 5/2020 | Murphy | |
| 10,689,200 B1* | 6/2020 | Lwali | B07C 5/36 |
| 10,793,336 B2 | 10/2020 | Zhang | |
| 10,810,534 B2* | 10/2020 | Taylor | G06K 7/10297 |
| 10,968,046 B2 | 4/2021 | Schaeffer | |
| 10,990,910 B2 | 4/2021 | Bischoff et al. | |
| 11,034,529 B2 | 6/2021 | Wagner et al. | |
| 2003/0127371 A1 | 7/2003 | Monti | |
| 2008/0277323 A1 | 11/2008 | Stovring | |
| 2017/0066597 A1 | 3/2017 | Hiroi | |
| 2020/0122928 A1* | 4/2020 | Bellar | B65G 13/11 |

FOREIGN PATENT DOCUMENTS

| | | |
|---|---|---|
| CN | 105728328 A | 7/2016 |
| CN | 205550878 U | 9/2016 |
| CN | 107520136 A | 12/2017 |
| CN | 206701743 U | 12/2017 |
| CN | 107876412 A | 4/2018 |
| CN | 207576955 U | 7/2018 |
| CN | 108554829 A | 9/2018 |
| CN | 209550002 U | 10/2019 |
| EP | 1083262 A3 | 8/2001 |
| EP | 2388132 A3 | 11/2012 |
| KR | 2011-0130569 A | 12/2011 |
| WO | 2004/079546 A2 | 9/2004 |
| WO | 2010/065839 A1 | 6/2010 |
| WO | 2011/007370 A1 | 1/2011 |

OTHER PUBLICATIONS

First Search dated Apr. 7, 2021, issued in related Chinese Application No. 201811236790.8 (2 pages).
First Office Action dated Apr. 15, 2021, issued in related Chinese Application No. 201811236790.8, with English machine translation (21 pages).

* cited by examiner

SYSTEM AND METHOD FOR PROCESSING LOGISTIC OBJECT, AND SORTING APPARATUS

CROSS-REFERENCE TO RELATED APPLICATIONS

This application is a continuation application of International Application No. PCT/CN2019/111618, filed on Oct. 17, 2019, which claims priority to and benefits of Chinese Patent Application No. 201811236790.8, filed on Oct. 23, 2018. The content of the above-referenced applications is incorporated herein by reference in their entirety.

TECHNICAL FIELD

This application relates to the field of computer technologies, and in particular, to a system and method for processing a logistics object, and a sorting apparatus.

BACKGROUND

With the development of the logistics industry, sorting of logistics objects such as logistics parcels increasingly relies on automation. Logistics objects can be sorted in a sorting center, and then packaged and transported to different destinations.

It is difficult for the existing sorting apparatus to sort medium- and large-sized logistics objects. For example, a cross-belt sorter cannot sort heavy logistics objects. Therefore, the medium- and large-sized logistics objects are usually sorted manually, resulting in low sorting efficiency.

SUMMARY

Embodiments of this application provide a system for processing a logistics object to improve logistics processing efficiency.

Correspondingly, the embodiments of this application also provide a method for processing a logistics object and a sorting apparatus, to ensure the implementation and application of the above system.

To resolve the foregoing problem, the embodiments of this application disclose a system for processing a logistics object. The system includes: a sorting apparatus, a transportation apparatus, and an output apparatus; the sorting apparatus comprises a logistics object conveyor, a chute, and a sorting platform, wherein the logistics object conveyor is connected to a first end of the chute, and a second end of the chute is connected to the sorting platform; the transportation apparatus includes: a supporting assembly; the output apparatus includes an output apparatus body and a control device; the logistics object conveyor of the sorting apparatus conveys a logistics object and moves the logistics object into the sorting platform through the chute, and the sorting platform drops the logistics object to the supporting assembly of the transportation apparatus; and the transportation apparatus moves to the output apparatus, the logistics object on the supporting assembly is placed from the supporting assembly of the transportation apparatus onto the output apparatus body of the output apparatus, and the control device determines a package consolidation container corresponding to the logistics object.

In some embodiments, the logistics object conveyor includes: a conveying assembly and a sorting assembly; the conveying assembly conveys a plurality of logistics objects; and the sorting assembly distributes the logistics objects in a balanced manner (e.g., evenly), and controls the logistics objects to enter corresponding chutes.

In some embodiments, the conveying assembly includes a plurality of conveying assembly sections, and the sorting assembly includes a plurality of sorting units; each of the sorting units is connected between two of the conveying assembly sections, and each of the sorting units is connected to a corresponding chute; a first conveying assembly section of the conveying assembly sections conveys a first logistics object of the logistics objects to a first sorting unit of the sorting units; when the first sorting unit is in a distribution state, the first sorting unit controls the first logistics object to enter a first chute connected to the first sorting unit; and when the first sorting unit is in a conveying state, the first sorting unit conveys the first logistics object to a next conveying assembly section.

In some embodiments, the sorting platform includes: a delivery assembly, a detection assembly, and a display assembly; where the delivery assembly drops the logistics object to the supporting assembly of the transportation apparatus; the detection assembly detects a position of the logistics object on the supporting assembly; and the display assembly displays load information of the transportation apparatus.

In some embodiments, the load information includes at least one of the following: the position of the logistics object on the supporting assembly, a logistics object identifier of the logistics object, and a destination of the logistics object.

In some embodiments, the detection assembly includes at least one of the following: an image acquisition device, a distance sensor, and a reflectivity sensor.

In some embodiments, the output apparatus body includes: at least one docking assembly and an output assembly; the docking assembly docks with the transportation apparatus, and obtains the logistics object from the supporting assembly of the transportation apparatus; and the output assembly outputs the logistics object obtained by the docking assembly.

In some embodiments, the output assembly includes: a conveyor belt and a storage platform; the control device includes: a computer (e.g., an industrial computer) and a first scanner; the conveyor belt conveys the logistics object obtained by the docking assembly to the storage platform; the first scanner obtains a logistics object identifier of the logistics object through scanning, and obtains a package consolidation identifier of a package consolidation container for the logistics object identifier; and the computer obtains, from the first scanner, the logistics object identifier and the package consolidation identifier for the logistics object identifier, and determines the package consolidation container bound to the package consolidation identifier.

In some embodiments, the computer displays the package consolidation container bound to the package consolidation identifier and the package consolidation identifier corresponding to the logistics object identifier.

In some embodiments, the system further includes a second scanner; the second scanner scans the logistics object on the sorting platform and obtains a logistics object identifier of the logistics object; and the transportation apparatus determines a corresponding output apparatus according to address information corresponding to the logistics object identifier.

In some embodiments, the transportation apparatus obtains the logistics object identifier from the second scanner or a main controller; and the second scanner transmits the logistics object identifier to the main controller of the system or the transportation apparatus.

In some embodiments, the system further includes the main controller; the main controller manages and coordinates the operations of the sorting apparatus, the transportation apparatus, and the output apparatus.

The embodiments of this application further disclose a sorting apparatus, and the sorting apparatus includes: a logistics object conveyor, a chute, and a sorting platform, wherein the logistics object conveyor is connected to a first end of the chute, and a second end of the chute is connected to the sorting platform; and the logistics object conveyor conveys a logistics object, determines the chute for the logistics object, and moves the logistics object into the sorting platform through the chute, and the sorting platform moves the logistics object to a supporting assembly of a transportation apparatus.

In some embodiments, the logistics object conveyor includes: a conveying assembly and a sorting assembly; the conveying assembly conveys a plurality of logistics objects; and the sorting assembly distributes the logistics objects in a balanced manner (e.g., evenly), and controls the logistics objects to enter corresponding chutes.

In some embodiments, the conveying assembly includes a plurality of conveying assembly sections, and the sorting assembly includes a plurality of sorting units; each of the sorting units is connected between two of the conveying assembly sections, and each of the sorting units is connected to a corresponding chute; a first conveying assembly section of the conveying assembly sections conveys a first logistics object of the logistics objects to a first sorting unit of the sorting units; when the first sorting unit is in a distribution state, the first sorting unit controls the first logistics object to enter a first chute connected to the first sorting unit; and when the first sorting unit is in a conveying state, the first sorting unit conveys the first logistics object to a next conveying assembly section.

In some embodiments, the sorting platform includes: a delivery assembly, a detection assembly, and a display assembly; where the delivery assembly drops the logistics object to the supporting assembly of the transportation apparatus; the detection assembly detects a position of the logistics object on the supporting assembly; and the display assembly displays load information of the transportation apparatus.

In some embodiments, the load information includes at least one of: the position of the logistics object on the supporting assembly, a logistics object identifier of the logistics object, and a destination of the logistics object.

In some embodiments, the detection assembly includes at least one of the following: an image acquisition device, a distance sensor, and a reflectivity sensor.

The embodiments of this application further disclose a method for processing a logistics object, applicable to the system for processing a logistics object in the embodiments of this application, where the method includes: conveying, by the logistics object conveyor of the sorting apparatus, a logistics object, and moving the logistics object into the sorting platform through the chute; dropping, by the sorting platform, the logistics object to a supporting assembly of the transportation apparatus; moving the transportation apparatus to the output apparatus, and placing the logistics object from the supporting assembly of the transportation apparatus to an output apparatus body of the output apparatus; and determining, by the output apparatus body, a package consolidation container corresponding to the logistics object through a control device of the output apparatus.

In some embodiments, the conveying, by the logistics object conveyor of the sorting apparatus, a logistics object, and sliding the logistics object into the sorting platform through the chute includes: conveying, by a first conveying assembly section of the conveying assembly, the logistics object to a first sorting unit connected to the first conveying assembly section; controlling, when the first sorting unit is in a distribution state, the logistics object to enter the chute; and conveying, when the first sorting unit is in a conveying state, the logistics object to a next conveying assembly section.

In some embodiments, the method further includes: detecting, by a detection assembly of the sorting platform, a position of the logistics object on the supporting assembly; and binding the logistics object to the supporting assembly according to the position of the logistics object on the supporting assembly.

In some embodiments, the method further includes: determining the load information of the transportation apparatus, and displaying the load information of the transportation apparatus on the display assembly.

In some embodiments, the moving the transportation apparatus to the output apparatus includes: determining, when more than one logistics object is placed on the transportation apparatus, a delivery sequence of the logistics objects on the transportation apparatus; and moving to corresponding output apparatuses in sequence according to the delivery sequence.

In some embodiments, the determining, by the output apparatus body, a package consolidation container corresponding to the logistics object through the control device includes: scanning, by a first scanner, the logistics object to obtain a logistics object identifier of the logistics object; and determining, according to the logistics object identifier, a package consolidation identifier of the corresponding package consolidation container.

In some embodiments, the method further includes: obtaining the logistics object identifier by the first scanner scanning the logistics object, and determining at least one package consolidation identifier corresponding to the logistics object identifier; binding each of the at least one package consolidation identifier to a corresponding package consolidation container respectively; and displaying, on the industrial computer, the package consolidation container bound to the package consolidation identifier and the package consolidation identifier corresponding to the logistics object identifier.

In some embodiments, the method further includes: managing and coordinating, by the main controller, the sorting apparatus, the transportation apparatus, and the output apparatus.

In some embodiments, the method further includes: moving the transportation apparatus from the sorting apparatus to the output apparatus according to a departure instruction sent by the sorting platform.

Compared with existing technologies, this application has the following advantages:

In the embodiments of this application, the system for processing a logistics object includes: a sorting apparatus, a transportation apparatus, and an output apparatus; the sorting apparatus includes: a logistics object conveyor, at least one chute, and at least one sorting platform; the logistics object conveyor is connected to one end of the at least one chute, and the other end of the at least one chute is connected to one sorting platform; the transportation apparatus includes: a supporting assembly; the output apparatus includes an output apparatus body and a control device; the logistics object conveyor of the sorting apparatus conveys a logistics object and slides the logistics object into the sorting platform through the chute, and the sorting platform drops the logistics object to the supporting assembly of the transportation apparatus, so as to automatically sort the logistics object; and the transportation apparatus moves to the output apparatus, the logistics object on the supporting assembly is placed onto the output apparatus body of the output apparatus, and the control device determines a package consolidation container corresponding to the logistics object, so as to conduct packaging processing of the logistics object and improve the efficiency of logistics processing.

DETAILED DESCRIPTION OF EMBODIMENTS

To make the foregoing objectives, features, and advantages of this application clearer and easier to understand, the following further describes this application in detail with reference to the accompanying drawings and specific implementations.

The embodiments of this application provide a system for processing a logistics object, which can automatically sort logistics objects and package the logistics objects in a centralized manner. Sorting of medium- and large-sized logistics objects can be implemented, and package consolidation containers of the logistics objects can be automatically determined, thereby completing packaging processing of logistics objects.

Figure 1:
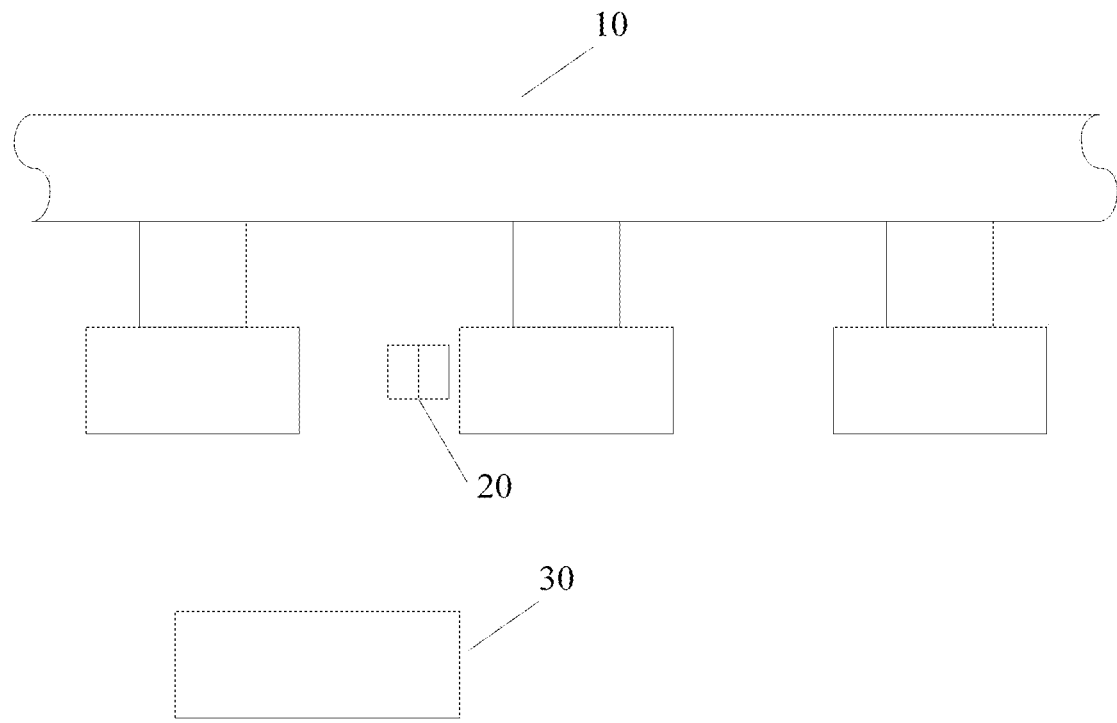
FIG. 1 is a schematic structural diagram of a system for processing logistics objects, according to an embodiment of this application.

FIG. 1 is a schematic structural diagram of a system for processing a logistics object, according to an embodiment of this application.

The system for processing a logistics object includes: a sorting apparatus 10, a transportation apparatus 20, and an output apparatus 30. The sorting apparatus 10 is configured to sort logistics objects; the transportation apparatus 20 is configured to transfer the logistics objects obtained from the sorting apparatus to different sorting platforms; the output apparatus 30 is configured to distribute the logistics objects to consolidation packages. The sorting apparatus may sort logistics objects. The logistics objects are sorted to different sorting platforms, so as to be sorted concurrently and then transported to different output apparatuses by the transportation apparatus, to facilitate subsequent packaging. The transportation apparatus refers to an apparatus for transporting logistics objects. For example, the transportation apparatus includes an automated guided vehicle (AGV). The transportation apparatus may be provided with more than one supporting assembly to sort a plurality of parcels at the same time. For example, supporting assemblies are disposed on the left and right sides of a transport vehicle, or four supporting assemblies are disposed on a transport vehicle. The supporting assembly refers to a component configured to carry a parcel on a transport vehicle. For example, the supporting assembly includes a supporting tray, a conveyor belt, and a roller.

Figure 2A:
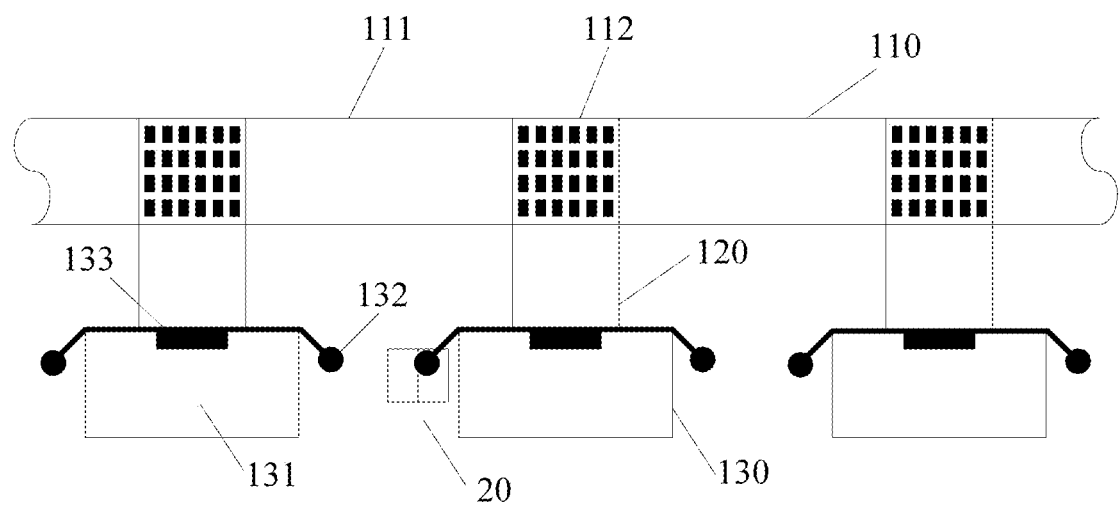
FIGS. 2A-2C are schematic structural diagrams of a sorting apparatus, according to an embodiment of this application.

In the schematic diagram of the sorting apparatus shown in FIG. 2A, the sorting apparatus 10 includes: a logistics object conveyor 110, at least one chute 120, and at least one sorting platform 130; the logistics object conveyor is connected to one end of the at least one chute, and the other end of each chute is connected to one sorting platform. The logistics object conveyor is configured to convey a logistics object and allocate a corresponding chute and sorting platform to the logistics object; the chute is configured to transfer the logistics object between the logistics object conveyor and the sorting platform, and can slide the logistics object from the logistics object conveyor into the sorting platform; and the sorting platform is configured to sort the logistics object and drop the logistics object into the transportation apparatus for sorting and transportation.

Figure 2B:
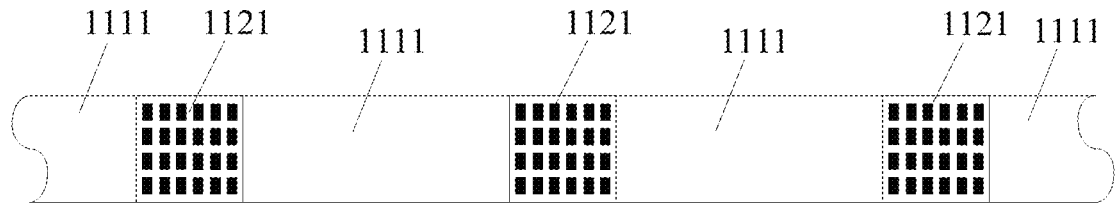

As shown in FIG. 2A and FIG. 2B, the logistics object conveyor 110 includes: a conveying assembly 111 and a sorting assembly 112. The conveying assembly is configured to convey a logistics object, and the sorting assembly is configured to distribute the logistics objects in a balanced manner (e.g., evenly) among the chutes 120, and controls the logistics objects to enter corresponding chutes. Therefore, logistics objects are conveyed through the conveying assembly. During the conveying process, the sorting assembly can distribute the logistics objects to the chutes in a balanced manner and control the logistics objects to enter the chutes.

The conveying assembly 111 includes a plurality of conveying assembly sections 1111, and the sorting assembly includes a plurality of sorting units 1121. One sorting unit 1121 is connected between two conveying assembly sections 1111, and the sorting unit 1121 is connected to the chute 120. Therefore, in the sorting apparatus, two ends of the sorting unit are each connected to one conveying assembly section, and one side of the sorting unit is connected to one end of the chute, and the other end of the chute is connected to a sorting platform. When logistics objects are conveyed on the conveying assembly sections and the sorting units, the sorting units can distribute the logistics objects to the chutes in a balanced manner (e.g., evenly). A processing method of a logistics object may be determined according to a state of the sorting unit. The state of the sorting unit includes a distribution state and a conveying state, where the distribution state is used to allocate the logistics object to the connected chute, and the conveying state is used to convey the logistics object. Therefore, the conveying assembly section conveys the logistics object to the sorting unit; and the sorting unit can determine, based on the logistics object corresponding to each chute, whether the current logistics object needs to enter a chute or continue to be conveyed, thereby adjusting the state of the sorting unit. After it is determined that the sorting unit is in a distribution state, the sorting unit controls the logistics object to enter the connected chute; and after it is determined that the sorting unit is in a conveying state, the sorting unit conveys the logistics object to the next conveying assembly section. A control unit may be provided on the sorting assembly to control each sorting assembly. Alternatively, a processor and other control components may be provided on the sorting apparatus to control the conveying and sorting of logistics objects. In the illustrated embodiment in FIG. 2C, each of the conveying assembly sections 1111 includes a plurality of rollers configured to convey/move the logistics objects along the conveying assembly 111. Each of the sorting unit 1121 includes a plurality of rollers configured to move the logistics objects along the conveying assembly 111 or to a chute 120 connected thereto.

The conveying assembly may be arranged in a variety of ways such as a conveyor belt, a chain, and rolling, so as to adapt to the sorting of medium- and large-sized logistics objects. The sorting assembly can distribute logistics objects to the chutes in a balanced manner through methods such as equal distribution and one-by-one distribution, for each sorting platform to have a logistics object, thereby improving the sorting efficiency.

Figure 2C:
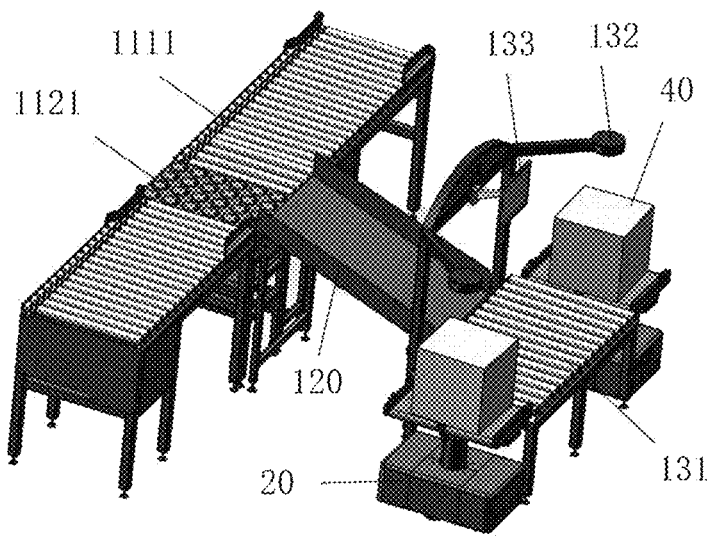

As shown in FIG. 2C, the sorting platform 130 includes: a delivery assembly 131, a detection assembly 132, and a display assembly 133. The delivery assembly 131 drops the logistics object to the supporting assembly of the transportation apparatus; the detection assembly 132 detects a position of the logistics object on the supporting assembly; and the display assembly 133 displays load information of the transportation apparatus. The load information includes: the position of the logistics object on the supporting assembly. The logistics object that slides through the chute can be placed onto the delivery assembly of the sorting platform. A position where the transportation apparatus stops to dock with the delivery assembly may be referred to as an entrance. The delivery assembly may correspond to a plurality of entrances, for the delivery assembly to be simultaneously docked with a plurality of transportation apparatus to improve sorting efficiency. The detection assembly may be set according to the entrance, and each entrance corresponds to one detection assembly, for the detection assembly to detect the transportation apparatus that stops at the entrance and determine a position of the logistics object on the supporting assembly and/or a size of the logistics object. According to the recognized size of the logistics object, a type of the logistics object may be determined, for example, a large parcel or a small parcel. The size of the large parcel and small parcel can be flexibly defined as required. The display assembly can display the load information of the transportation apparatus, for example, a position of the logistics object on the supporting assembly of the transportation apparatus, a quantity and sizes of carried logistics objects, or no logistics object being placed on the transportation apparatus.

FIG. 2C is a schematic diagram of a partial area of a sorting apparatus, which further includes a logistics object 40. The logistics object 40 is conveyed from the conveying assembly section 1111 to the sorting unit 1121. The sorting unit 1121 is in the distribution state, and can slide the logistics object 40 from the chute 120 to the delivery assembly 131. The delivery assembly 131 drops the logistics object to the transportation apparatus 20, the detection assembly 132 detects the position of the logistics object on the supporting assembly of the transportation apparatus 20, and the display assembly 133 displays the load information of the transportation apparatus.

The delivery assembly may be an automatic rolling assembly to automatically drop logistics objects, or may be an assembly that rolls based on an external force, such as a non-powered roller, where the assembly is driven by an external force, such as a manual force or other machine power, to roll and drop logistics objects. In addition, in some embodiments, assemblies such as a mechanical arm may also be provided on the delivery assembly. In this case, the mechanical arm can grasp the logistics object, and logistics object information such as the size and weight of the logistics object can be determined after the logistics object is grasped. When the logistics object is dropped to the supporting assembly of the transportation apparatus, the position of the logistics object on the supporting assembly can be determined according to the logistics object information. For example, when the size or weight exceeds a corresponding threshold, the logistics object is dropped in the middle of the supporting assembly, and when the size or weight does not exceed the corresponding threshold, the logistics object is dropped on either the left or right side of the supporting assembly, etc.

The detection assembly may be an image acquisition device such as a camera, a two-dimensional camera, or may be a distance sensor, a reflectivity sensor, or the like, to identify logistics objects on the supporting assembly. For example, the distance sensor is a laser distance sensor, and the reflectivity sensor is an ultrasonic reflectivity sensor. Based on the change in the distance measured by the distance sensor, or the change in the reflectivity measured by the reflectivity sensor, it can be determined whether there is a transportation apparatus at the entrance, whether there is a logistics object on the supporting assembly of the transportation apparatus, the position of the logistics object on the supporting assembly, and so on.

In some embodiments, the system may further include a second scanner. The second scanner may be an independent apparatus in the system or an assembly on the sorting apparatus. The second scanner may scan the logistics object on the sorting platform to obtain a logistics object identifier of the logistics object, determine a logistics object destination of the logistics object and other address information of the logistics object based on the logistics object identifier, and upload the address information such as the logistics object identifier and the logistics object destination to a server and/or a main controller. The server and/or the main controller transmits the address information such as the logistics object identifier and the logistics object destination to the transportation apparatus.

Alternatively, the second scanner directly transmits the address information such as the logistics object identifier and the logistics object destination to the transportation apparatus.

Then the transportation apparatus may determine a corresponding output apparatus according to address information corresponding to the logistics object identifier.

The display assembly may also display the logistics object information such as the logistics object identifier and the logistics object destination. Based on the position detected by the detection assembly, the logistics object and the position of the supporting assembly can be bound, which is convenient for the transportation apparatus to accurately distinguish each logistics object when processing a plurality of logistics objects. The process of binding the logistics object to the position of the supporting assembly based on the position detected by the detection assembly may be performed by the detection assembly or by a server and/or a main controller, and the binding result is transmitted to the transportation apparatus.

The display assembly may further include a dispatch button in a physical form or a virtual form, through which a dispatch instruction may be outputted, thereby instructing the transportation apparatus to depart. When the transportation apparatus carries logistics objects but is not full, the dispatch button may be used to instruct the transportation apparatus to depart, so as to transport the placed logistics objects. For example, if a logistics object is required to be delivered within a time limit, or if the transportation apparatus has waited for a long time but there is no suitable logistics object, the transportation apparatus may be instructed to depart when not fully loaded with logistics objects, to transport the carried logistics objects.

Therefore, in the sorting apparatus, the logistics object conveyor may distribute the logistics objects to the chutes in a balanced manner, and then the logistics objects slide down to the sorting platforms through the chutes. The delivery assembly of the sorting platform can drop the logistics object on the supporting assembly of the transportation apparatus. The detection assembly is then used to detect the position of the logistics object on the supporting assembly, and the position is displayed on the display assembly. Therefore, automatic sorting of logistics objects is realized, and sorting efficiency is effectively improved.

Figure 3A:
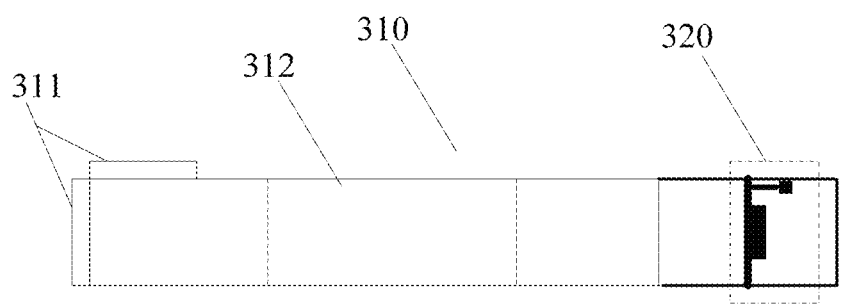
FIGS. 3A-3D are schematic structural diagrams of an output apparatus, according to an embodiment of this application.

As shown in FIG. 3A, the output apparatus includes an output apparatus body 310 and a control device 320. The output apparatus body may store the logistics object temporarily, to distribute the logistics object to a consolidation package. The control device may control the consolidation package distribution of the logistics object and determine a package consolidation container of the logistics object, and the like. The logistics object conveyor of the sorting apparatus conveys a logistics object and slides the logistics object into the sorting platform through the chute, and the sorting platform drops the logistics object to the supporting assembly of the transportation apparatus. The transportation apparatus moves to the output apparatus, the logistics object on the supporting assembly is placed onto the output apparatus body of the output apparatus, and a package consolidation container corresponding to the logistics object is determined by the control device.

The output apparatus body 310 includes: at least one docking assembly 311 and an output assembly 312; each docking assembly may be docked with the transportation apparatus to obtain the logistics object from the supporting assembly of the transportation apparatus; and the output assembly outputs the logistics object obtained by the docking assembly. Therefore, the output apparatus can obtain logistics objects from a plurality of transportation apparatuses at the same time, which improves processing efficiency.

Figure 3B:
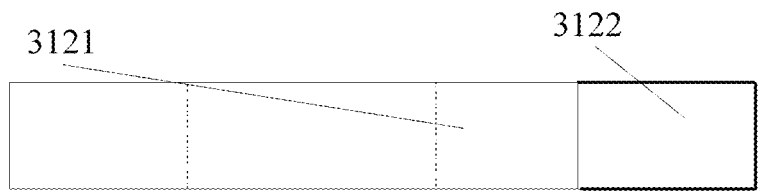

As shown in FIG. 3B, the output assembly 312 includes: a conveyor belt 3121 and a storage platform 3122. The conveyor belt conveys the logistics object obtained by the docking assembly to the storage platform. The conveyor belt may be designed with a plurality of sections. In this way, when there are a plurality of logistics objects on the conveyor belt, the plurality of logistics objects can be processed in sections. For example, the first logistics object is conveyed to the storage platform, and the subsequent logistics objects are temporarily stored in other sections. The storage platform is an assembly capable of storing logistics objects. As shown in FIG. 3D, a chute with one or more openings is adopted. After the one or more openings obtain the logistics object from the conveyor belt, the logistics object slides down to the bottom of the chute. The bottom is provided with a partition or the like to stop the logistics object from sliding. Therefore, the logistics object can be stored on the storage platform, and moved after a package consolidation container is determined.

Figure 3C:
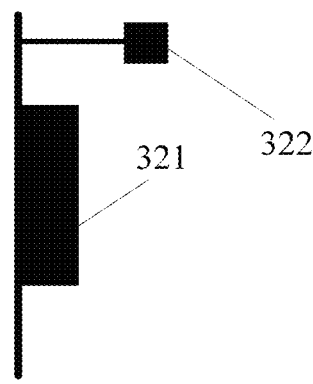
Figure 3D:
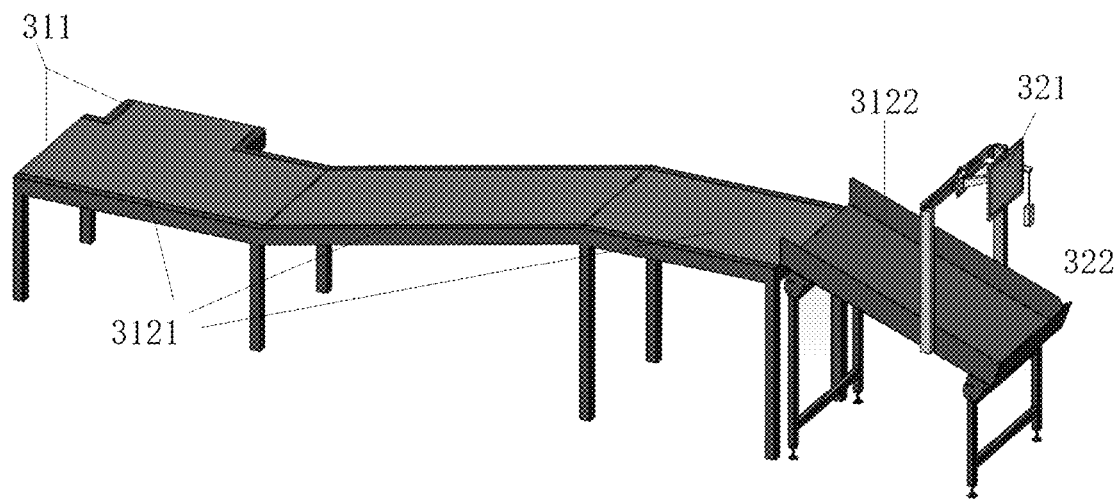

As shown in FIG. 3C, the control device 320 includes: an industrial computer 321 and a first scanner 322; the scanner obtains a logistics object identifier through scanning, then determines a package consolidation identifier of a package consolidation container corresponding to the logistics object, and transmits the logistics object identifier and the package consolidation identifier corresponding to the logistics object to the industrial computer. The industrial computer is configured to determine a package consolidation container bound to the package consolidation identifier according to the package consolidation identifier corresponding to the logistics object. The industrial computer is further configured to display the package consolidation container bound to the package consolidation identifier and the package consolidation identifier corresponding to the logistics object identifier. The package consolidation identifier refers to an identification code of a consolidated package. In a logistics process, logistics objects of the same route, such as the same destination, may be consolidated in one package consolidation container to form a large parcel for transportation, and this is the package consolidation process. Therefore, each package consolidation container may correspond to one package consolidation identifier, and each output apparatus may correspond to a plurality of package consolidation containers. Therefore, the package consolidation identifier obtained through scanning may be bound to the package consolidation container, and after the first scanner scans the logistics object, the package consolidation identifier can be determined based on the logistics object identifier. The industrial computer can display the package consolidation container bound to the package consolidation identifier and the package consolidation identifier corresponding to the logistics object identifier, and perform package consolidation processing based on the displayed information.

In the embodiments of this application, the system further includes a main controller. The main controller may manage and coordinate the sorting apparatus, the transportation apparatus, and the output apparatus. In the sorting apparatus, the main controller can control the logistics object conveyor to distribute the logistics objects to the chutes in a balanced manner. Definitely, the process of balanced distribution may be performed by the sorting unit. The main controller can also obtain the logistics object identifier based on the second scanner, determine logistics information based on the logistics object identifier, and thus determine destination information. The logistics object is bound to the transportation apparatus carrying the logistics object. For example, according to the position of the logistics object on the supporting assembly detected by the detection assembly, the logistics object may be bound to the supporting assembly, thereby facilitating the subsequent transportation of the logistics object and determining of an output apparatus. For the transportation apparatus, the main controller can determine the sorting apparatus with which the logistics object is docked, so as to guide the transportation apparatus to a corresponding entrance; Based on the binding between the logistics object and the supporting assembly, an output apparatus may be determined based on the destination of the logistics object, so as to guide the transportation apparatus to the position of the docking assembly of the output apparatus. The transportation apparatus can determine, according to the binding relationship, the supporting assembly on which the logistics object needs to be transported, and transport the logistics object on the supporting assembly to the output apparatus. When the transportation apparatus carries more than one logistics object, the main controller may further determine a delivery sequence of the logistics objects according to an algorithm, so as to select respective output apparatuses corresponding to the logistics objects and sequentially transport the logistics objects. For the output apparatus, the main controller can determine at least one package consolidation container corresponding to the output apparatus, and bind the package consolidation identifier to the package consolidation container. In the embodiments of this application, the main controller may be a master controller in the system for processing a logistics object, or may be formed by a plurality of controllers, or may be distributed in the sorting apparatus, the transportation apparatus, and the output apparatus of the system for processing a logistics object. This is not limited in the embodiments of this application.

Based on the foregoing embodiments, this embodiment further provides a method for processing a logistics object, which can process logistics objects, such as sorting and package consolidation, based on the system for processing a logistics object.

Figure 4:
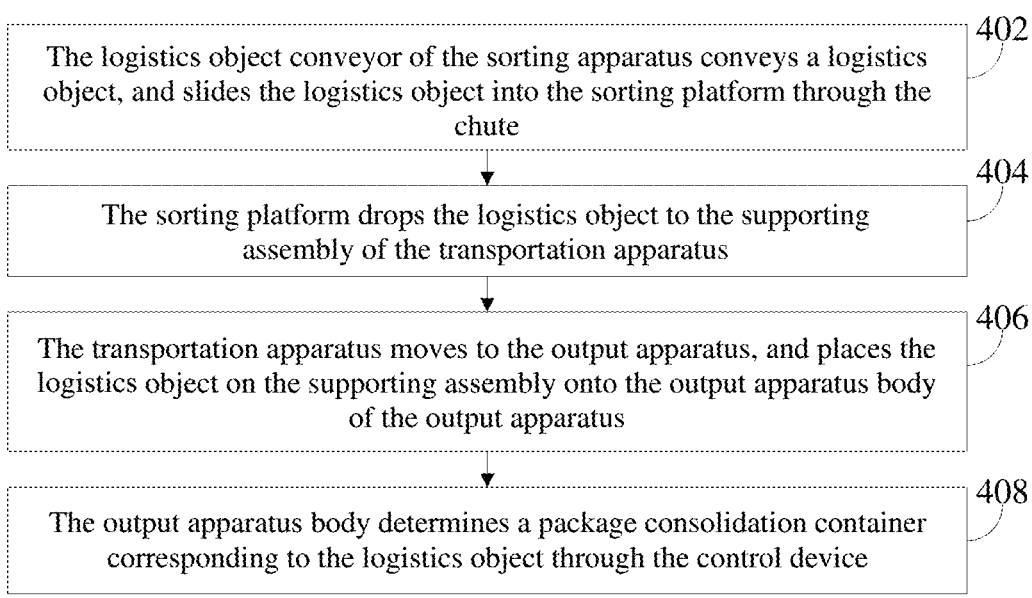
FIG. 4 is a flowchart of a method for processing a logistics object, according to one embodiment of this application.

FIG. 4 is a flowchart of a method for processing logistics objects, according to an embodiment of this application.

At step 402, the logistics object conveyor of the sorting apparatus conveys a logistics object, and slides the logistics object into the sorting platform through the chute.

The sorting apparatus can convey the logistics object on the logistics object conveyor. During the conveying process, when the logistics object reaches the chute that the logistics object needs to enter, the conveying direction of the logistics object can be adjusted, so as to push the logistics object into the chute, and the logistics object can slide down to the sorting platform through the chute.

At step 404, the sorting platform drops the logistics object to the supporting assembly of the transportation apparatus.

The sorting platform can drop the logistics object onto the supporting assembly of the transportation apparatus through the delivery assembly. For example, the logistics object is moved to the transportation apparatus through a roller, a mechanical arm, or the like.

At step 406, the transportation apparatus moves to the output apparatus, and places the logistics object on the supporting assembly onto the output apparatus body of the output apparatus.

The supporting assembly of the transportation apparatus carries the logistics object. After departure is allowed, the transportation apparatus can move. The corresponding output apparatus is determined according to the carried logistics object. The transportation apparatus then moves to the output apparatus, the logistics object on the supporting assembly is controlled to be placed on the output apparatus body, and the output apparatus carries out the subsequent package consolidation.

At step 408, the output apparatus body determines a package consolidation container corresponding to the logistics object through the control device.

The output apparatus body can store the logistics object, and the control device can determine the package consolidation container corresponding to the logistics object. In this way, the package consolidation container corresponding to the stored logistics object is determined. Later, the logistics object can be moved to the package consolidation container. After the package consolidation container is full, the container can be moved to a delivery location for delivery.

Figure 5:
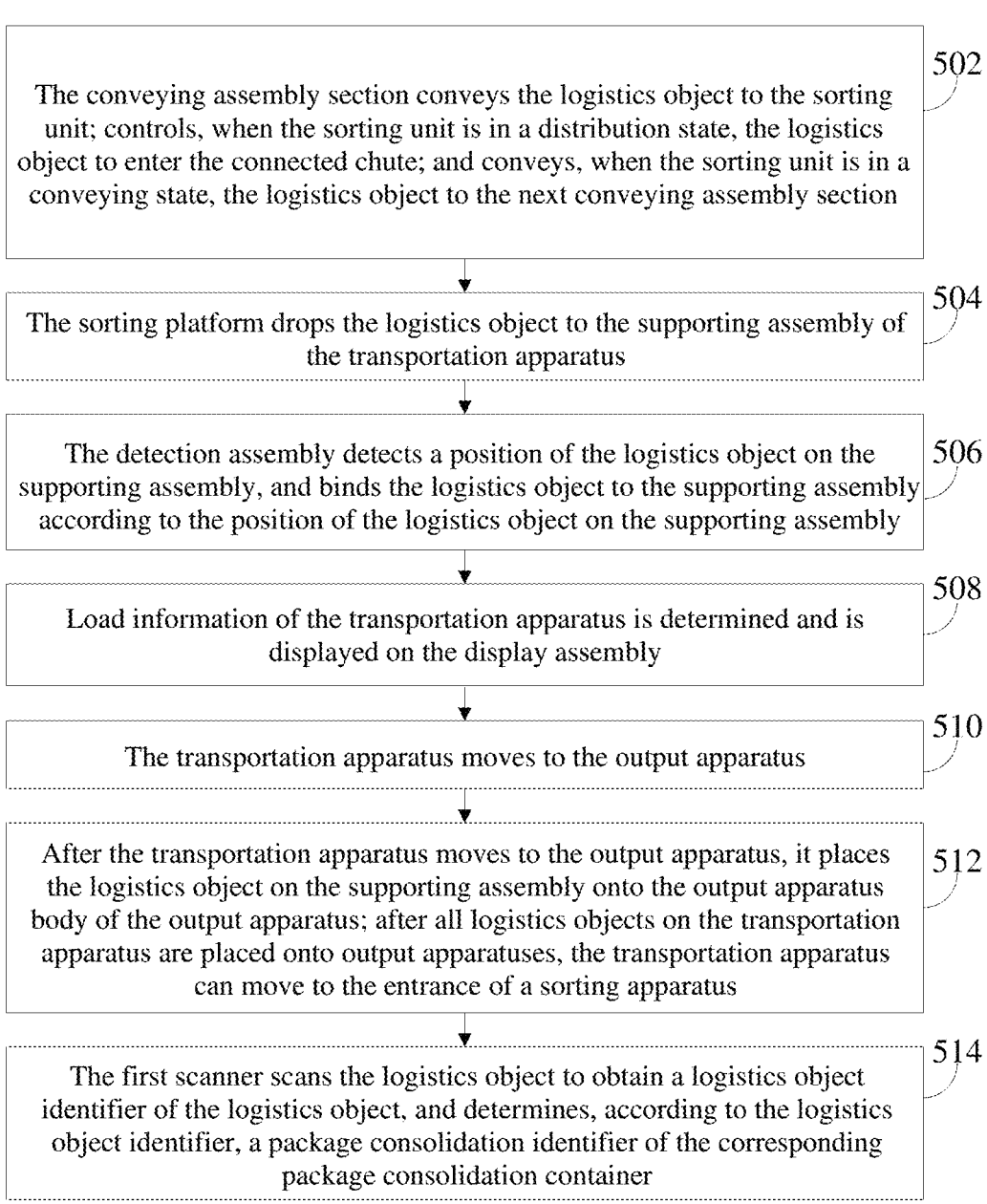
FIG. 5 is a flowchart of another method for processing a logistics object, according to one embodiment of this application.

FIG. 5 is a flowchart of a method for processing logistics objects, according to another embodiment of this application.

At step 502, the conveying assembly section conveys the logistics object to the sorting unit; controls, after it is determined that the sorting unit is in a distribution state, the logistics object to enter the connected chute; and conveys, after it is determined that the sorting unit is in a conveying state, the logistics object to a next conveying assembly section.

After being placed onto the sorting apparatus, the logistics object can be transferred between the conveying assembly and the sorting unit. During the conveying process, the sorting unit can distribute the logistics objects to the chutes in a balanced manner, and control the logistics objects to enter the chutes. When reaching a chute that a logistics object needs to enter, the logistics object enters the chute. The processing method of the logistics object may be determined according to the state of the sorting unit. The sorting unit can determine, based on the logistics objects corresponding to the chutes, whether a current logistics object needs to enter a chute or continue to be conveyed, thereby adjusting the state of the sorting unit.

At step 504, the sorting platform drops the logistics object to the supporting assembly of the transportation apparatus.

The transportation apparatus can stop at the entrance, to be docked with the sorting platform. Then, the sorting platform can drop the logistics object that slides down from chute to the supporting assembly of the transportation apparatus. When a plurality of transportation apparatuses need to obtain logistics objects from one sorting platform, the transportation apparatus can be guided to different entrances of the sorting platform. If there are still transportation apparatuses unable to stop at entrances, the transportation apparatuses can wait in line. After other transportation apparatuses leave the entrances, the transportation apparatuses waiting in line can enter the entrances in order.

The second scanner may scan the logistics object identifier of the logistics object on the sorting platform, and then the logistics object is dropped on the supporting assembly of the transportation apparatus; or the logistics object may be dropped on the supporting assembly of the transportation apparatus and then be scanned to obtain the logistics object identifier. The second scanner may be an independent device such as a handheld barcode scanner, or an assembly on the sorting platform, so as to automatically scan and obtain the logistics object identifier.

At step 506, the detection assembly detects a position of the logistics object on the supporting assembly, and binds the logistics object to the supporting assembly according to the position of the logistics object on the supporting assembly.

The detection assembly can detect, in real time, the transportation apparatus that stops at the entrance, so as to determine the position of the logistics object on the supporting assembly, for example, on the left supporting assembly of the transportation apparatus, or on the right supporting assembly of the transportation apparatus, or in the middle of the two supporting assemblies of the transportation apparatus.

When the detection assembly fails, a mobile device, such as a handheld device of an operator, may be used to bind the supporting assembly of the logistics object to the logistics object. For example, after the logistics object is scanned, the position of the logistics object on the transportation apparatus is scanned, to determine the corresponding supporting assembly for binding.

At step 508: load information of the transportation apparatus is determined and displayed on the display assembly.

The logistics object identifier, the position of the logistics object on the supporting assembly, and the like, can also be transmitted to the main controller, for the main controller to bind the logistics object identifier to the corresponding supporting assembly of the transportation apparatus. The main controller determines the load information of the transportation apparatus according to the binding relationship, and transmits the load information to the sorting apparatus. The sorting apparatus displays the load information of the transportation apparatus on the display assembly of the sorting platform. The binding relationship is sent to the transportation apparatus, to facilitate the transportation apparatus to transport the logistics object subsequently.

After the logistics objects placed on the transportation apparatus meet departure conditions, the transportation apparatus can automatically leave the sorting apparatus and move to the output apparatus. The departure conditions can be set as required. For example, logistics objects are placed on all supporting assemblies of the transportation apparatus, or supporting assemblies of logistics object jointly carry one logistics object. In some scenarios, if a logistics object is placed on the transportation apparatus, but the departure conditions are not met, a departure button of the display assembly may be triggered to send a departure instruction. The departure instruction may be sent to the transportation apparatus directly or through the main controller. The transportation apparatus moves from the logistics object conveyor to the output apparatus.

At step 510, the transportation apparatus moves to the output apparatus. When there is one logistics object on the transportation apparatus, the corresponding output apparatus is determined based on information such as the destination of the logistics object, and the transportation apparatus moves to the corresponding output apparatus; when more than one logistics object is placed on the transportation apparatus, a delivery sequence of the transportation apparatus is determined, and the transportation apparatus moves to the corresponding output apparatuses according to the delivery sequence.

At step 512, after the transportation apparatus moves to the output apparatus, the transportation apparatus places the logistics object on the supporting assembly onto the output apparatus body of the output apparatus. After all the logistics objects on the transportation apparatus are placed onto the corresponding output apparatuses, the transportation apparatus can move to the entrance of the sorting apparatus. For example, the transportation apparatus can transport two parcels to different output apparatuses at a time, and then move to the entrance after all the parcels are transported.

At step 514, the first scanner scans the logistics object to obtain a logistics object identifier of the logistics object; and determines, according to the logistics object identifier, a package consolidation identifier of a corresponding package consolidation container.

At least one package consolidation identifier is obtained through scanning by the first scanner; the at least one package consolidation identifier is each bound to a corresponding package consolidation container; the package consolidation container bound to the package consolidation identifier and the package consolidation identifier corresponding to the logistics object identifier are displayed on the industrial computer. Each docking assembly of the output apparatus can dock with the transportation apparatus, obtain the logistics object from the supporting assembly of the transportation apparatus, and transport the logistics object obtained by the docking assembly to the storage platform. Then the first scanner scans the logistics object to obtain a logistics object identifier of the logistics object, and determines, according to the logistics object identifier, a package consolidation identifier of the corresponding package consolidation container.

After that, the operator can move the logistics object to the corresponding package consolidation container for stacking. After the package consolidation container is full of logistics objects, the operator can pull the package consolidation container to a designated parking area and place a new package consolidation container at the output apparatus. At the same time, the operator scans again to obtain a new package consolidation identifier and binds the new package consolidation identifier to the package consolidation container. After that, the operator continues to stack logistics objects. For package consolidation containers in the designated parking area, package consolidation identifiers may be scanned to inform an automatic forklift or pulling personnel to move any full-load package consolidation container to the delivery location, such as a platform, for delivery. After sorting and package consolidation, the logistics objects reach the delivery location such as the platform, and can be loaded for delivery later.

Therefore, through the foregoing system for processing a logistics object, it takes a shorter time for the transportation apparatus to go back and forth between the sorting apparatus and the output apparatus, thereby improving the sorting efficiency and transporting logistics objects flexibly. In the package consolidation process, the workload of a package consolidation operator who scans a plurality of logistics object identifiers at the same time can be reduced, and there is no need to separate the logistics objects in the package consolidation container for the convenience of scanning, which can improve the carrying capacity of the logistics objects in the package consolidation container, reduce a waste of time in the stacking process, improve the processing efficiency, and reduce the probability of missing packages and errors.

In the embodiment of this application, the sorting apparatus slides the logistics objects in to the chutes in a balanced manner, which improves the processing efficiency. In addition, the sorting apparatus can automatically detect the position of logistics object on the supporting assembly of the transportation apparatus, which improves the processing efficiency and facilitates the processing of the transportation apparatus. A plurality of parcel can be delivered at the same time. Medium- and large-sized logistics objects weighing up to 50 kg can be processed, and the quantity of apparatuses can be dynamically adjusted to implement flexible automation construction from 0 to 1 in the sorting scene of medium- and large-sized logistics objects.

Based on the sorting by the transportation apparatus and the sorting apparatus, after parcels reach the output apparatus, systematic package consolidation can be completed during package stacking. In this way, the package consolidation operator no longer needs to scan a plurality of parcels, and the reaction time of the stacking operator is reduced. Currently, package stacking is like building blocks, where issues such as positions of different logistics objects and keeping express sheet facing outward need to be considered. However, in the embodiments of this application, the stacking operator only needs to fill the package consolidation container with logistics objects, which can increase the stacking capacity of a single package consolidation container (that is, the carrying capacity of the logistics object). Compared with the existing packaging method, the embodiments of this application can also greatly reduce the probability of missing packaging packages. The operator only needs to fill up the package consolidation container without worrying about missing a package. Compared with the manual sorting in the existing sorting center, the embodiments of this application can reduce four types of personnel in the sorting scenario: rough sorting operators, operators for adjusting package orientations, sorting operators, and packaging operators, thereby completing sorting and package consolidation in the scenario more efficiently while reducing labor costs.

It should be noted that for the sake of simple description, the method embodiments are all described as a series of action combinations. However, those skilled in the art should know that the embodiments of this application are not limited by the described action sequence because some steps may be performed in other sequences or simultaneously according to the embodiments of this application. Secondly, those skilled in the art should also know that the embodiments described in the specification are all preferred embodiments, and the actions involved are not necessarily required by the embodiments of this application.

An embodiment of this application further provides a nonvolatile readable storage medium, and the storage medium stores one or more programs. The one or more programs, when applied to an apparatus, may cause the apparatus to execute instructions of the method steps in the embodiments of this application, where the apparatus may be an apparatus having a processor, for example, a main controller, a sorting apparatus, a transportation apparatus and an output apparatus.

An embodiment of this application further provides one or more machine-readable media storing instructions. The instructions, when executed by one or more processors, cause an electronic device to perform one or more methods according to the foregoing embodiments. In the embodiments of this application, the electronic device includes a main controller, a sorting apparatus, a transportation apparatus, an output apparatus, or the like.

Figure 6:
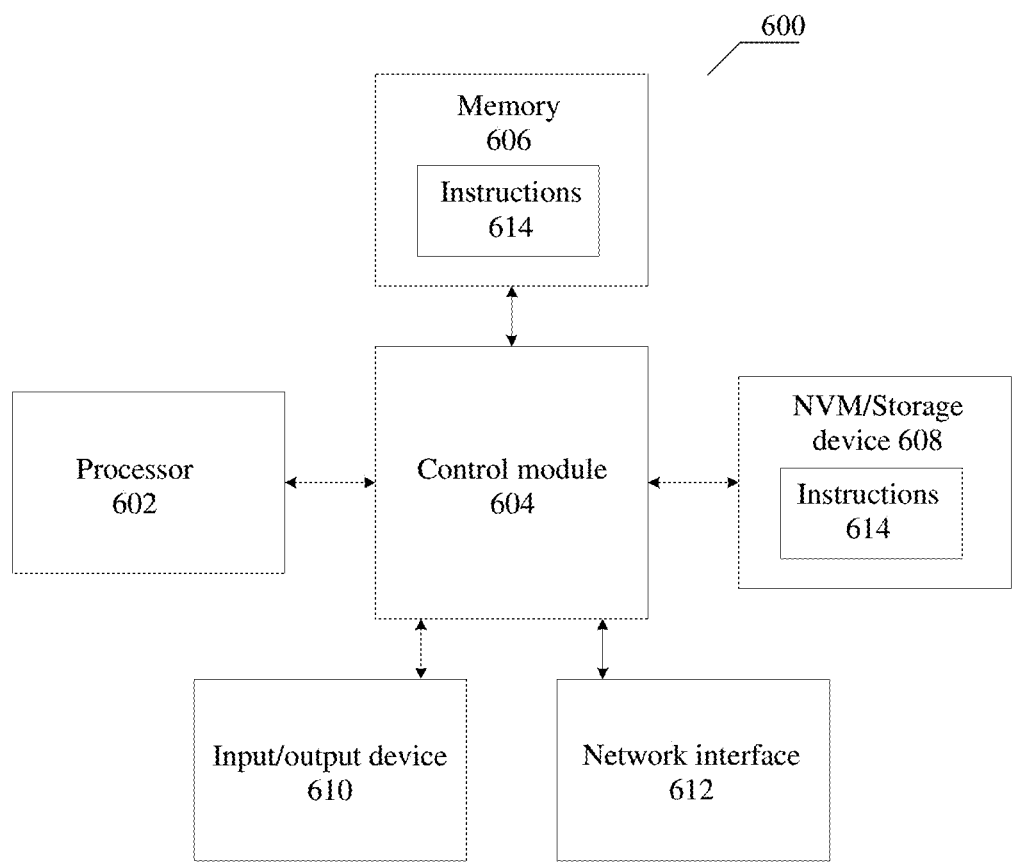
FIG. 6 is a schematic structural diagram of a device, according to an embodiment of this application.

The embodiments of this application can be implemented as an apparatus that uses any appropriate hardware, firmware, software, or any combination thereof to implement a desired configuration. The apparatus may include a main controller, a sorting apparatus, a transportation apparatus, an output apparatus and other electronic devices. FIG. 6 schematically shows an exemplary apparatus 600 that can be used to implement the embodiments described in this application.

In an embodiment, FIG. 6 shows an exemplary apparatus 600. The device includes one or more processors 602, at least one control module (chipset) 604 coupled to the (one or more) processor(s) 602, a memory 606 coupled to the control module 604, a nonvolatile memory (NVM)/storage device 608 coupled to the control module 604, one or more input/output devices 610 coupled to the control module 604, and a network interface 612 coupled to the control module 604.

The processor 602 may include one or more single-core or multi-core processors, and the processor 602 may include any combination of a general-purpose processor or a special-purpose processor (for example, a graphics processor, an application processor, and a baseband processor). In some embodiments, the apparatus 600 may be used as the main controller, the sorting apparatus, the transportation apparatus, and the output apparatus in the embodiments of this application.

In some embodiments, the apparatus 600 may include one or more computer-readable media (for example, the memory 606 or the NVM/storage device 608) having instructions 614 and the one or more processors 602 that are combined with the one or more computer-readable media and configured to execute the instructions 614 to implement modules to perform the actions described in this application.

In an embodiment, the control module 604 may include any suitable interface controller to provide any suitable interface to at least one of the (one or more) processor(s) 602 and/or any suitable device or component communicating with the control module 604.

The control module 604 may include a memory controller module to provide an interface to the memory 606. The memory controller module may be a hardware module, a software module, and/or a firmware module.

The memory 606 may be configured to, for example, load and store data and/or the instructions 614 for the apparatus 600. In an embodiment, the memory 606 may include any suitable volatile memory, for example, a suitable DRAM. In some embodiments, the memory 606 may include a double data rate type 4 synchronous dynamic random access memory (DDR4 SDRAM).

In an embodiment, the control module 604 may include one or more input/output controllers to provide interfaces to the NVM/storage device 608 and the (one or more) input/output device(s) 610.

For example, the NVM/storage device 608 may be configured to store data and/or the instructions 614. The NVM/storage device 608 may include any suitable nonvolatile memory (for example, flash memory) and/or may include any suitable (one or more) nonvolatile storage device(s) (for example, one or more hard disk drives (HDD), one or more compact disc (CD) drives and/or one or more digital versatile disc (DVD) drives).

The NVM/storage device 608 may include a part of storage resources of a physical device on which the apparatus 600 is installed, or may be accessed by the device and may not necessarily be a part of the device. For example, the NVM/storage device 608 can be accessed via the (one or more) input/output device(s) 610 via a network.

The (one or more) input/output device(s) 610 may provide an interface for the apparatus 600 to communicate with any other suitable devices. The input/output device 610 may include a communication component, an audio component, a sensor component, and the like. The network interface 612 can provide an interface for the apparatus 600 to communicate through one or more networks, and according to any of one or more wireless network standards and/or protocols, the apparatus 600 can wirelessly communicate with one or more components of a wireless network, for example, accessing a wireless network based on a communication standard such as WiFi, 2G, 3G, 4G, or 5G, or a combination thereof, for wireless communication.

In an embodiment, at least one of the (one or more) processor(s) 602 may be packaged with the logic of one or more controllers (for example, memory controller modules) of the control module 604. In an embodiment, at least one of the (one or more) processor(s) 602 may be packaged with the logic of one or more controllers of the control module 604 to form a system in package (SiP). In an embodiment, at least one of the (one or more) processor(s) 602 may be integrated with the logic of one or more controllers of the control module 604 on the same mold. In an embodiment, at least one of the (one or more) processor(s) 602 may be integrated with the logic of one or more controllers of the control module 604 on the same mold to form a system-on-a-chip (SoC).

In the embodiments, the apparatus 600 may be, but is not limited to, a terminal device such as a server, a desktop computing device, or a mobile computing device (for example, a laptop computing device, a handheld computing device, a tablet computer, a netbook). In the embodiments, the apparatus 600 may have more or fewer components and/or different architectures. For example, in some embodiments, the apparatus 600 includes one or more cameras, keyboards, liquid crystal display (LCD) screens (including touchscreen displays), nonvolatile memory ports, a plurality of antennas, graphics chips, application specific integrated circuits (ASIC) and speakers.

The detection device may use the master chip as a processor or a control module. Sensor data, location information and the like are stored in a memory or NVM/storage device. The sensor group may be used as an input/output device, and the communication interface may include a network interface.

The apparatus embodiments are substantially similar to the method embodiments and therefore are only briefly described, and reference may be made to the method embodiments for the corresponding sections.

The embodiments in this specification are all described in a progressive manner, each embodiment focuses on a difference from other embodiments, and for same or similar parts in the embodiments, reference may be made to these embodiments.

The embodiments of this application is described with reference to flowcharts and/or block diagrams of the method, the terminal device (the system), and the computer program product in the embodiments of this application. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a dedicated computer, an embedded processor, or a processor of any other programmable data processing terminal device to generate a machine, so that the instructions executed by a computer or a processor of any other programmable data processing terminal device generate an apparatus for implementing functions specified in one or more processes in the flowcharts and/or in one or more blocks in the block diagrams.

These computer program instructions may also be stored in a computer-readable memory that can guide a computer or another programmable data processing terminal device to work in a specific manner, so that the instructions stored in the computer-readable memory generate a product including an instruction apparatus, where the instruction apparatus implements functions specified in one or more processes in the flowcharts and/or in one or more blocks in the block diagrams.

These computer program instructions may also be loaded onto a computer or another programmable data processing terminal device, so that a series of operations and steps are performed on the computer or another programmable terminal device to generate computer-implemented processing. Therefore, the instructions executed on the computer or the another programmable terminal device provide steps for implementing functions specified in one or more processes in the flowcharts and/or in one or more blocks in the block diagrams.

Although preferable embodiments of this application have been described, once knowing a basic creative concept, persons skilled in the technology can make other changes and modifications to these embodiments. Therefore, the following claims are intended to cover the preferable embodiments and all changes and modifications falling within the scope of the embodiments of this application.

At last, it should be noted that, in this specification, relational terms such as first and second are used only to distinguish one entity or operation from another, and do not necessarily require or imply any actual relationship or sequence between these entities or operations. Moreover, the terms "include," "comprise." and any variants thereof are intended to cover a non-exclusive inclusion. Therefore, a process, method, object, or terminal device that includes a series of elements not only includes such elements, but also includes other elements not specified expressly, or may include inherent elements of the process, method, object, or terminal device. Unless otherwise specified, an element limited by "include a/an . . . " does not exclude other same elements existing in the process, method, object, or terminal device that includes the element.

The system for processing a logistics object and method, and the sorting apparatus provided in this application are described in detail above. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification should not be construed as a limitation to this application.

What is claimed is:

1. A system for processing logistics objects, the system comprising: a sorting apparatus, a transportation apparatus, and an output apparatus, wherein:
    the sorting apparatus comprises a logistics object conveyor, a chute, and a sorting platform, wherein the logistics object conveyor is connected to a first end of the chute, and a second end of the chute is connected to the sorting platform;
    the transportation apparatus comprises a supporting assembly;
    the output apparatus comprises an output apparatus body and a control device;
    the logistics object conveyor of the sorting apparatus conveys a logistics object and moves the logistics object into the sorting platform through the chute, and the sorting platform drops the logistics object to the supporting assembly of the transportation apparatus; and the transportation apparatus moves to the output apparatus, the logistics object on the supporting assembly is placed from the supporting assembly of the transportation apparatus onto the output apparatus body of the output apparatus, and the control device determines a package consolidation container corresponding to the logistics object.

2. The system according to claim 1, wherein the logistics object conveyor comprises: a conveying assembly and a sorting assembly;
    the conveying assembly conveys a plurality of logistics objects; and
    the sorting assembly distributes the logistics objects to enter corresponding chutes in a balanced manner.

3. The system according to claim 2, wherein the conveying assembly comprises a plurality of conveying assembly sections, and the sorting assembly comprises a plurality of sorting units;
    each of the sorting units is connected between two of the conveying assembly sections, and each of the sorting units is connected to one of the corresponding chutes;
    a first conveying assembly section of the conveying assembly sections conveys a first logistics object of the logistics objects to a first sorting unit of the sorting units;

when the first sorting unit is in a distribution state, the first sorting unit controls the first logistics object to enter a first chute of the corresponding chutes connected to the first sorting unit; and when the first sorting unit is in a conveying state, the first sorting unit conveys the first logistics object to a next conveying assembly section of the plurality of conveying assembly sections.

4. The system according to claim 1, wherein the sorting platform comprises: a delivery assembly, a detection assembly, and a display assembly, wherein
the delivery assembly moves the logistics object onto the supporting assembly of the transportation apparatus;
the detection assembly detects a position of the logistics object on the supporting assembly; and
the display assembly displays load information of the transportation apparatus.

5. The system according to claim 4, wherein the load information comprises at least one of: the position of the logistics object on the supporting assembly, a logistics object identifier of the logistics object, and a destination of the logistics object.

6. The system according to claim 4, wherein the detection assembly comprises at least one of: an image acquisition device, a distance sensor, and a reflectivity sensor.

7. The system according to claim 1, wherein the output apparatus body comprises:
at least one docking assembly and an output assembly;
the docking assembly docks with the transportation apparatus, and obtains the logistics object from the supporting assembly of the transportation apparatus; and
the output assembly outputs the logistics object obtained by the docking assembly.

8. The system according to claim 7, wherein the output assembly comprises: a conveyor belt and a storage platform; the control device comprises: a computer and a first scanner;
the conveyor belt conveys the logistics object obtained by the docking assembly to the storage platform;
the first scanner obtains a logistics object identifier of the logistics object through scanning, and obtains a package consolidation identifier of a package consolidation container for the logistics object identifier; and
the computer obtains, from the first scanner, the logistics object identifier and the package consolidation identifier for the logistics object identifier, and determines the package consolidation container bound to the package consolidation identifier.

9. The system according to claim 8, wherein
the computer displays the package consolidation container bound to the package consolidation identifier and the package consolidation identifier corresponding to the logistics object identifier.

10. The system according to claim 1, further comprising a second scanner, wherein
the second scanner scans the logistics object on the sorting platform and obtains a logistics object identifier of the logistics object; and
the transportation apparatus determines the output apparatus according to address information corresponding to the logistics object identifier.

11. The system according to claim 10, wherein
the transportation apparatus obtains the logistics object identifier from the second scanner or a main controller of the system; and
the second scanner transmits the logistics object identifier to the main controller or the transportation apparatus.

12. A sorting apparatus, comprising:
a logistics object conveyor, a chute, and a sorting platform, wherein
the logistics object conveyor is connected to a first end of the chute, and a second end of the chute is connected to the sorting platform;
the logistics object conveyor conveys a logistics object, determines the chute for the logistics object, and moves the logistics object into the sorting platform through the chute, and the sorting platform moves the logistics object to a supporting assembly of a transportation apparatus, and
the sorting platform comprises: a delivery assembly, a detection assembly, and a display assembly, wherein
the delivery assembly moves the logistics object to the supporting assembly of the transportation apparatus;
the detection assembly detects a position of the logistics object on the supporting assembly; and
the display assembly displays load information of the transportation apparatus.

13. The sorting apparatus according to claim 12, wherein the logistics object conveyor comprises: a conveying assembly and a sorting assembly;
the conveying assembly conveys a plurality of logistics objects; and
the sorting assembly distributes the logistics objects to enter corresponding chutes in a balanced manner.

14. The sorting apparatus according to claim 13, wherein the conveying assembly comprises a plurality of conveying assembly sections, and the sorting assembly comprises a plurality of sorting units;
each of the sorting units is connected between two of the conveying assembly sections, and each of the sorting units is connected to one of the corresponding chutes;
a first conveying assembly section of the conveying assembly sections conveys a first logistics object of the logistics objects to a first sorting unit of the sorting units;
when the first sorting unit is in a distribution state, the first sorting unit controls the first logistics object to enter a first chute of the corresponding chutes connected to the first sorting unit; and
when the first sorting unit is in a conveying state, the first sorting unit conveys the first logistics object to a next conveying assembly section of the plurality of conveying assembly sections.

15. The sorting apparatus according to claim 12, wherein the load information comprises at least one of: the position of the logistics object on the supporting assembly, a logistics object identifier of the logistics object, and a destination of the logistics object.

16. The sorting apparatus according to claim 12, wherein the detection assembly comprises at least one of: an image acquisition device, a distance sensor, and a reflectivity sensor.

17. A method for processing logistics objects at a system for processing a logistics object, wherein the system comprises a sorting apparatus, a transportation apparatus, and an output apparatus, and the sorting apparatus comprises a logistics object conveyor, a chute, and a sorting platform, the method comprising:
conveying, by the logistics object conveyor of the sorting apparatus, a logistics object, and moving the logistics object into the sorting platform through the chute;
dropping, by the sorting platform, the logistics object to a supporting assembly of the transportation apparatus;

moving the transportation apparatus to the output apparatus, and placing the logistics object from the supporting assembly of the transportation apparatus to an output apparatus body of the output apparatus; and determining, by the output apparatus body, a package consolidation container corresponding to the logistics object through a control device of the output apparatus.

18. The method according to claim 17, the logistics object conveyor comprises a conveying assembly and a sorting assembly, wherein the conveying assembly comprises a plurality of conveying assembly sections, and the sorting assembly comprises a plurality of sorting units, and wherein the conveying, by the logistics object conveyor of the sorting apparatus, a logistics object, and moving the logistics object into the sorting platform through the chute comprises:

conveying, by a first conveying assembly section of the conveying assembly, the logistics object to a first sorting unit of the plurality of sorting units connected to the first conveying assembly section;

controlling, when the first sorting unit is in a distribution state, the logistics object to enter the chute; and conveying, when the first sorting unit is in a conveying state, the logistics object to a next conveying assembly section of the plurality of conveying assembly sections.

19. The method according to claim 17, further comprising:

detecting, by a detection assembly of the sorting platform, a position of the logistics object on the supporting assembly; and binding the logistics object to the supporting assembly according to the position of the logistics object on the supporting assembly.

\* \* \* \* \*